Patented Apr. 28, 1953

2,636,891

UNITED STATES PATENT OFFICE 2,636,891

HETEROCYCLIC ORGANO-TIN COMPOUNDS CONTAINING OXYGEN, SULFUR, AND TIN IN THE RING

Walter A. Gregory, Wilmington, Del., assignor to E. I. du Pont de Nemours and Company, Wilmington, Del., a corporation of Delaware No Drawing. Application December 27, 1950, Serial No. 203,029

8 Claims. (Cl. 260—429)

1

This invention relates to novel organotin compounds containing tin-sulfur linkages, and more particularly to 2,2-dialkyl-1-oxa-2-stanna-3-thiacyclopentan-5-one, 2,2-dialkyl-1-oxa-2-stanna-3-thiacyclohexan-6-one and 5-amino-2,2-dialkyl-1-oxa-2-stanna - 3 - thiacyclohexan - 6 - one, wherein the alkyl group contains not more than six carbon atoms, and to processes of producing these compounds.

The products of my invention can be represented by the following general structural formula:

1.

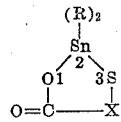

where R is an alkyl radical containing from one to six carbon atoms and X is a divalent radical selected from the group consisting of methylene

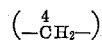

ethylene

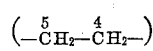

and aminoethylene in which the amino group is attached to the carbon in the 5-position

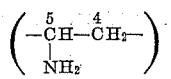

According to the present invention it has been found that the novel compounds represented graphically by Formula 1 can be prepared by reacting a compound of formula:

2.

where Y is a member of the group consisting of oxygen, dihalogen, dinitrate, and diacetate, and R has the same significance as in Formula 1, with a compound selected from the group consisting of thioglycollic acid, beta-mercaptopropionic acid and cysteine.

The organotin compounds which can be employed in the processes of my invention include dialkyltin dinitrates, dialkyltin diacetates, dialkyltin oxides and dialkyltin dihalides, preferably the dialkyltin dichlorides. Each of the alkyl groups in the dialkyltin compounds should be identical and should contain not more than six carbon atoms. The alkyl groups, which include methyl, ethyl, propyl, butyl, amyl and hexyl, are preferably straight chained but branched chained alkyls such as, for example, isopropyl, isobutyl, sec-butyl and isoamyl, can be used. Particularly preferred of the dialkyltin compounds for my invention are those of the dibutyl series. Typical products of the butyl series which are available on the market include dibutyltin oxide, dibutyltin dichloride and dibutyltin diacetate.

If desired, the commercially available dialkyltin compounds may be further purified prior to use in my novel processes. For example, the purification of dibutyltin oxide is preferably carried out by reprecipitating it from a filtered aqueous nitric acid solution containing commercial dibutyltin oxide by the slow addition of ammonium hydroxide.

It will be understood that all of the starting materials used in my novel processes can be synthesized from known chemicals. By way of illustration, a dialkyltin dihalide can be prepared by reacting the appropriate Grignard reagent with tin tetrahalide. The dialkyltin dihalide is converted to the corresponding diacetate by reaction with ammonium hydroxide to form dialkyltin oxide which in turn is reacted with acetic acid. A preferred synthetic route to the dialkyltin diacetate involves the reaction of dialkyltin dihalide with sodium acetate.

The reaction between a compound of Formula 2 and a carboxy substituted thiol, selected from the group consisting of thioglycollic acid, beta-mercaptopropionic acid and cysteine, to produce my novel products is preferably carried out at room temperature by thoroughly mixing an acidic solution of the dialkyltin compound of Formula 2 with the thiol. An aqueous solution of the thiol hydrochloride is preferably employed. The crystalline precipitate which separates can be collected by filtration and washed with a water-immiscible organic liquid, such as diethyl ether. Even without further refinement of the product, analysis of it conforms closely to the calculated value. If desired, the solid product may be further purified by recrystallization, preferably from glacial acetic acid.

Alternatively, the crystalline precipitate which separates out under the above described conditions can be dissolved prior to isolation by the addition to the reaction mixture of a weak base, preferably ammonium hydroxide. The material which is insoluble in the basic solution is removed by filtration. The filtrate is neutralized with acid, yielding the desired white crystalline product of the invention.

My novel products characterized by their white crystalline structure possess noteworthy antibacterial properties. They are especially suitable for use as toxicants for microorganisms, particularly for bacteria and fungi. The compounds of my invention are also effective in reducing the incidence of cecal coccidiosis of chickens, a disease caused by a microscopic protozoan parasite, *Eimeria tenella*.

The invention is illustrated by the following examples:

EXAMPLE 1

*2,2-dibutyl-1-oxa-2-stanna-3-thiacyclopentan-5-one*

A solution of 10 parts of commercial dibutyltin diacetate in 26 parts of glacial acetic acid is stirred during the addition of 26 parts of thioglycollic acid. Stirring of the mixture is continued until no further precipitate forms. The white crystalline product is filtered, washed with diethyl ether, and then recrystallized from 168 parts of glacial acetic acid. The purified product consisting of 2,2-dibutyl-1-oxa-2-stanna-3-thiacyclopentan-5-one has a melting point of 185–187° C. and possesses the following formula:

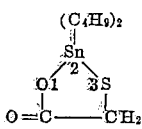

Analysis calculated for $C_{10}H_{20}O_2SSn$: S, 9.91. Found: S, 9.94, 10.08.

Using the process of Example 1, 2,2-dipropyl-1-oxa-2-stanna-3-thiacyclopentan-5-one, 2,2-diisoamyl-1-oxa-2-stanna-3-thiacyclopentan-5-one, 2,2-dihexyl-1-oxa-2-stanna-3-thiacyclopentan-3-one and the like can be readily prepared by merely substituting the appropriate dialkyltin compound of Formula 2 for the dibutyltin diacetate of Example 1.

EXAMPLE 2

*5 - amino - 2,2 - dibutyl - 1 - oxa - 2 - stanna - 3 - thiacyclohexan - 6 - one*

To a stirred solution of 24.9 parts of dibutyltin oxide in 150 parts of water containing 45 parts of nitric acid (specific gravity 1.42, 71% by weight) there is added a solution of 31.5 parts of cysteine hydrochloride in 50 parts of water. A white crystalline precipitate separates. The reaction mixture is then made basic by the slow addition of ammonium hydroxide, whereupon the crystals dissolve and a noncrystalline precipitate separates. The mixture is made more strongly basic causing the greater portion of the precipitate to dissolve. The resulting solution is filtered, and the filtrate neutralized with glacial acetic acid. The desired product, 5-amino - 2,2 - dibutyl - 1 - oxa - 2 - stanna - 3 - thiacyclohexan-6-one, separates from the solution. This product, which has the formula shown below, decomposes at a temperature of 205–207° C.

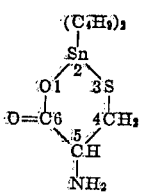

Analysis calculated for $C_{11}H_{23}NO_2SSn$: N, 3.98. Found: N, 3.96, 4.08.

2,2 - dibutyl - 1 - oxa - 2 - stanna - 3 - thiacyclohexan-6-one can be prepared by merely substituting beta-mercaptopropionic acid for cysteine hydrochloride in the process of Example 2.

Similarly, other compounds such as 2,2 - dimethyl - 1 -oxa - 2 - stanna - 3 - thiacyclohexan - 6 - one,
2,2 - diethyl - 1 -oxa - 2 - stanna - 3 - thiacyclohexan - 6 - one,
2,2 - di - n - propyl - 1 - oxa - 2 - stanna - 3 - thiacyclohexan - 6 - one,
2,2 - di - isopropyl - 1 - oxa - 2 - stanna - 3 - thiacyclohexan - 6 - one,
2,2 - di - sec - butyl - 1 - oxa - 2 - stanna - 3 - thiacyclohexan - 6 - one,
2,2 - di - n - amyl - 1 - oxa - 2 - stanna - 3 - thiacyclohexan - 6 - one,
2,2 - di - isoamyl - 1 - oxa - 2 - stanna - 3 - thiacyclohexan - 6 - one,
2,2 - di - ter - amyl - 1 - oxa - 2 - stanna - 3 - thiacyclohexan - 6 - one,
2,2 - di - n - hexyl - 1 - oxa - 2 - stanna - 3 - thiacyclohexan - 6 - one,
2,2 - di - isohexyl - 1 - oxa - 2 - stanna - 3 - thiacyclohexan - 6 - one,
5 - amino - 2,2 - dimethyl - 1 - oxa - 2 - stanna - 3 - thiacyclohexan - 6 - one,
5 - amino - 2,2 - diethyl - 1 - oxa - 2 - stanna - 3 - thiacyclohexan - 6 - one,
5 - amino - 2,2 - di - n - propyl - 1 - oxa - 2 - stanna - 3 - thiacyclohexan - 6 - one,
5 - amino - 2,2 - di - isopropyl - 1 - oxa - 2 - stanna - 3 - thiacyclohexan - 6 - one,
5 - amino - 2,2 - di - sec - butyl - 1 - oxa - 2 - stanna - 3 - thiacyclohexan - 6 - one,
5 - amino - 2,2 - di - n- amyl - 1 - oxa - 2 - stanna - 3 - thiacyclohexan - 6 - one,
5 - amino - 2,2 - di - isoamyl - 1 - oxa - 2 - stanna - 3 - thiacyclohexan - 6 - one,
5 - amino - 2,2 - di - ter - amyl - 1 - oxa - 2 - stanna - 3 - thiacyclohexan - 6 - one,
5 - amino - 2,2 - di - n - hexyl - 1 - oxa - 2 - stanna - 3 - thiacyclohexan - 6 - one,
5 - amino - 2,2 - di - isohexyl - 1 - oxa - 2 - stanna - 3 - thiacyclohexan - 6 - one, can be made by the method of Example 2 by simply substituting the appropriate dialkyltin compound of Formula 2 for the dibutyltin oxide of Example 2.

I claim:

1. A compound represented by the formula:

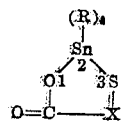

where R is an alkyl radical containing not more than six carbon atoms and X is a divalent radical selected from the group consisting of methylene

ethylene

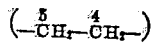

and amino ethylene in which the amino group is attached to the carbon in the 5-position

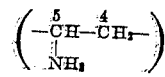

2. 2,2-dibutyl - 1 - oxa - 2 -stanna - 3 - thiacyclopentan-5-one, a compound having the formula

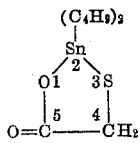

3. 2,2-dibutyl-1-oxa-2-stanna-3-thiacyclohexan-6-one, a compound having the formula

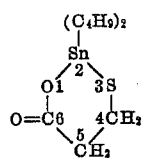

4. 5-amino-2,2-dibutyl-1-oxa-2-stanna-3-thiacyclohexan-6-one, a compound having the formula

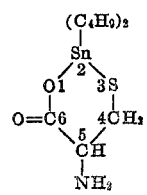

5. A process for the production of a compound of claim 1 which comprises reacting a compound of formula, $$R_2SnY$$

where R is an alkyl radical containing not more than six carbon atoms, and Y is a member of the group consisting of oxygen, dihalogen, dinitrate, and diacetate, with a compound selected from the group consisting of thioglycollic acid, beta-mercaptopropionic acid and cysteine.

6. A process for the production of 2,2-dibutyl-1-oxa-2-stanna-3-thiacyclopentan-5-one, a compound having the formula

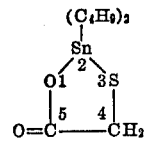

which comprises reacting dibutyltin diacetate with thioglycolic acid in the presence of glacial acetic acid.

7. A process for the production of 2,2-dibutyl-1-oxa-2-stanna-3-thiacyclohexan-6-one, a compound having the formula

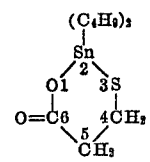

which comprises reacting beta-mercaptopropionic acid with dibutyltin oxide in an acidic medium.

8. A process for the production of 5-amino-2,2-dibutyl-1-oxa-2-stanna-3-thiacyclohexan-6-one, a compound having the formula

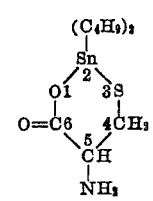

which comprises reacting cysteine hydrochloride with dibutyltin oxide in a dilute nitric acid medium.

WALTER A. GREGORY.

References Cited in the file of this patent

C. A., vol. 28, page 62.

Mann, The Chemistry of Heterocyclic Compounds—The Heterocyclic Derivative of Phosphorus, Arsenic, Antimony, Bismouth and Silicaon—page 151, Interscience Publishers Inc., New York, 1950, see also Ber. 39, 1356 (1906).